(12) United States Patent
Ideue (10) Patent No.: US 7,896,387 B2
(45) Date of Patent: Mar. 1, 2011

(54) AIR BAG DEVICE FOR AUTOMOBILE

(75) Inventor: Masahiro Ideue, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 97 days.

(21) Appl. No.: 12/153,702

(22) Filed: May 22, 2008

(65) Prior Publication Data

US 2008/0296876 A1   Dec. 4, 2008

(30) Foreign Application Priority Data

May 23, 2007   (JP) .................................. 2007-136823

(51) Int. Cl.
   *B60R 21/213*   (2006.01)
   *B60R 21/207*   (2006.01)
   *B60R 21/233*   (2006.01)
(52) U.S. Cl. .................. 280/730.2; 280/729; 280/743.1
(58) Field of Classification Search ............... 280/730.2, 280/729, 743.1
   See application file for complete search history.

(56) References Cited

U.S. PATENT DOCUMENTS

| 6,217,060 B1 * | 4/2001 | Mangold et al. ........... 280/730.2 |
| 6,302,436 B1 * | 10/2001 | Eyrainer ..................... 280/730.2 |
| 2006/0017267 A1 * | 1/2006 | Fink ........................... 280/730.2 |
| 2006/0066079 A1 * | 3/2006 | Inoue et al. ................. 280/730.2 |
| 2006/0097492 A1 * | 5/2006 | Bakhsh et al. ............. 280/730.2 |

FOREIGN PATENT DOCUMENTS

| JP | 11-208410 | 8/1999 |
| JP | 2000-33847 | 2/2000 |
| JP | 2000-190807 | 7/2000 |
| JP | 3520836 | 2/2004 |
| JP | 2006-69280 | 3/2006 |
| JP | 2007-50847 | 3/2007 |
| JP | 2007-62599 | 3/2007 |

OTHER PUBLICATIONS

JP 2007-62599 A, Yamamura, published, Mar. 15, 2007, Machine Translation.*
Japanese Office Action dated Dec. 16, 2008.

* cited by examiner

*Primary Examiner* — Paul N. Dickson
*Assistant Examiner* — George D. Spisich
(74) *Attorney, Agent, or Firm* — Finnegan, Henderson, Farabow, Garrett & Dunner, LLP (57) ABSTRACT

An air bag device for automobile comprising a side air bag member arranged at a vehicle body side portion or a vehicle seat in a folded state, expanded by being supplied with a gas upon a vehicle being impacted from the side or rolling over, and which deploys between a passenger seated on the vehicle seat and the vehicle body side portion, and a head portion protection air bag member which deploys in a curtain shape in a downward direction inside of a vehicle compartment up to a position of overlapping a deploying region of the side air bag member in a vehicle width direction, and which has a shape that fits with the deployed side air bag member.

14 Claims, 6 Drawing Sheets

AIR BAG DEVICE FOR AUTOMOBILE

CROSS-REFERENCE TO RELATED APPLICATIONS

This application claims priority under 35 USC 119 from Japanese Patent Application No. 2007-136823, filed May 23, 2007, the disclosure of which is incorporated by reference herein.

BACKGROUND OF THE INVENTION

1. Field of the Invention

The present invention relates to an air bag device for an automobile, particularly relates to an air bag device for an automobile in consideration of side impact and rolling over of a vehicle.

2. Description of the Related Art

JP-A No. 2000-190807 discloses a constitution of combining a head protection air bag member and a side air bag member as an apparatus of expanding a vehicle passenger binding system. Further, Japanese Patent No. 3520836 discloses a constitution in which an air bag expanded to deploy in a curtain shape at a side portion in a vehicle compartment includes a head protection expansion area constituted substantially by an upper half thereof and an extending expansion area constituted substantially by a lower half thereof and extended to a position lower than a belt line of a door. The head protection expansion area is arranged with an expanding portion having a large thickness and the extending expansion area is arranged with an expanding portion having a thickness smaller than that of the expanding portion having a wide width.

However, according to a related art described in Japanese Patent No. 3520836, the head protection air bag member is not extended to the position lower than the belt line of the door, and interference between the head protection air bag member and the side air bag member is not taken into consideration at all. Further, according to the related art described in Japanese Patent No. 3520836 mentioned above, a combination of the air bag expanded to deploy in the curtain shape and the side air bag member is not taken into consideration at all.

SUMMARY OF THE INVENTION

The present invention has been made in view of the above circumstances and provides an air bag device for an automobile.

A first mode of the invention includes a side air bag member arranged in a folded state at a vehicle body side portion or a vehicle seat, which expands by being supplied with a gas upon a vehicle being impacted from the side or rolling over, and which deploys between a passenger seated on the vehicle seat and the vehicle body side portion, and a head portion protection air bag member arranged in a folded state along a roof side rail, which expands by being supplied with a gas upon a vehicle being impacted from the side or rolling over, and which deploys in a curtain shape in a downward direction inside of a vehicle compartment up to a position overlapping a deploying region of the side air bag in a vehicle width direction, and which has a shape that fits with the deployed side air bag member.

According to the first mode of the invention, when the side impact or the rolling over of the vehicle is brought about, the side air bag member deploys between the passenger seated on the vehicle seat and the vehicle body head portion, and the head portion protection air bag member deploys in the curtain shape in the downward direction inside of the vehicle compartment up to the position of overlapping the head portion protection air bag member and the deploying region of the side air bag member in the vehicle width direction. At this occasion, the deployed side air bag member can be fitted to the head portion protection air bag member. Therefore, an interference between the side air bag member and the head portion protection air bag member can be restrained while deploying the head portion protection air bag member to the position of overlapping the deploying region of the side air bag member in the vehicle width direction, thereby, both of side impact and the rolling over of the vehicle can be dealt with.

BRIEF DESCRIPTION OF THE DRAWINGS

FIG. 1 through FIG. 3 relate to a first embodiment and FIG. 1 is a side view viewing a vehicle including an air bag device for automobile from an inner side of a vehicle compartment.

FIG. 4 through FIG. 6 relate to a second embodiment and FIG. 4 is an enlarged side view viewing a state of deploying a head protection air bag member and a side air bag member in correspondence with a front vehicle seat in a state in which the front vehicle seat is disposed on a front side of the vehicle from an inner side of a vehicle compartment;

DETAILED DESCRIPTION OF THE INVENTION

Embodiments of the invention will be explained in reference to the drawings as follows.

First Embodiment

Figure 1:
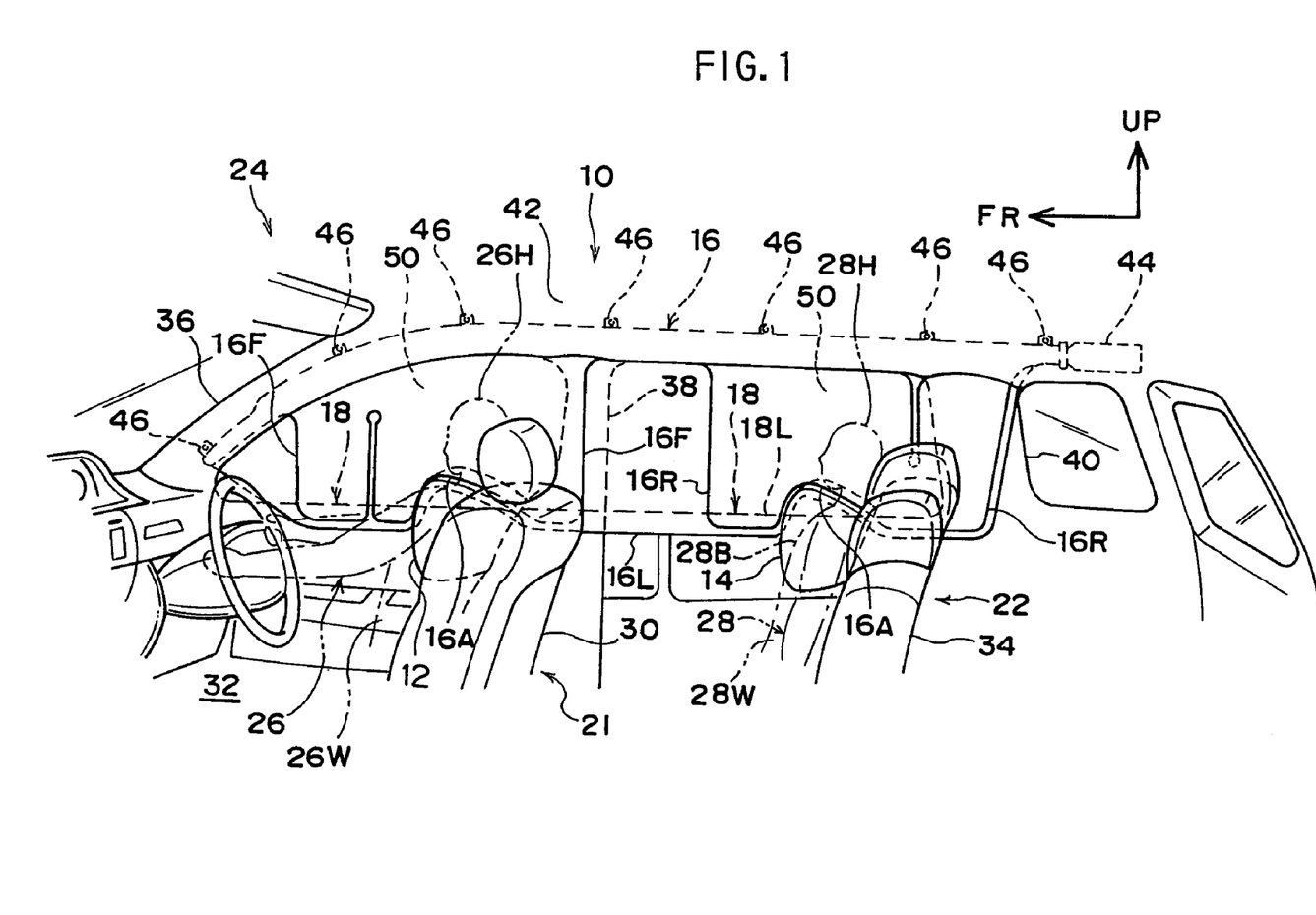

In FIG. 1, an air bag device for automobile 10 according to the embodiment includes side air bag member 12 and 14 and a head protection air bag member 16.

The side air bag member 12 is a bag member arranged in a folded state inside of a door 18 constituting a side portion of a vehicle body or at a front vehicle seat 21 constituting an example of a vehicle seat and expands by being supplied with a gas from an inflator, not illustrated, and deployed between a passenger 26 seated on the front vehicle seat 21 and the door 18 in side impact or in rolling over of a vehicle 24.

According to the embodiment, an air bag module (not illustrated) constituted by containing, for example, the side air bag member 12 and an inflator inside of an air bag case is inwardly provided at a side portion on a side of the door of the seat back 30 of the front vehicle seat 21. The inflator is constituted to be operated by receiving an operating current from an air bag ECU, not illustrated, for supplying a gas for expansion to the side air bag member 12. The air bag ECU is constituted to make an operating current flow to the inflator when side impact or rolling over of the vehicle 24 is determined based on a signal from a side impact sensor or a rolling over sensor. Here, at the air bag module, the air bag case need not be provided.

Figure 2:
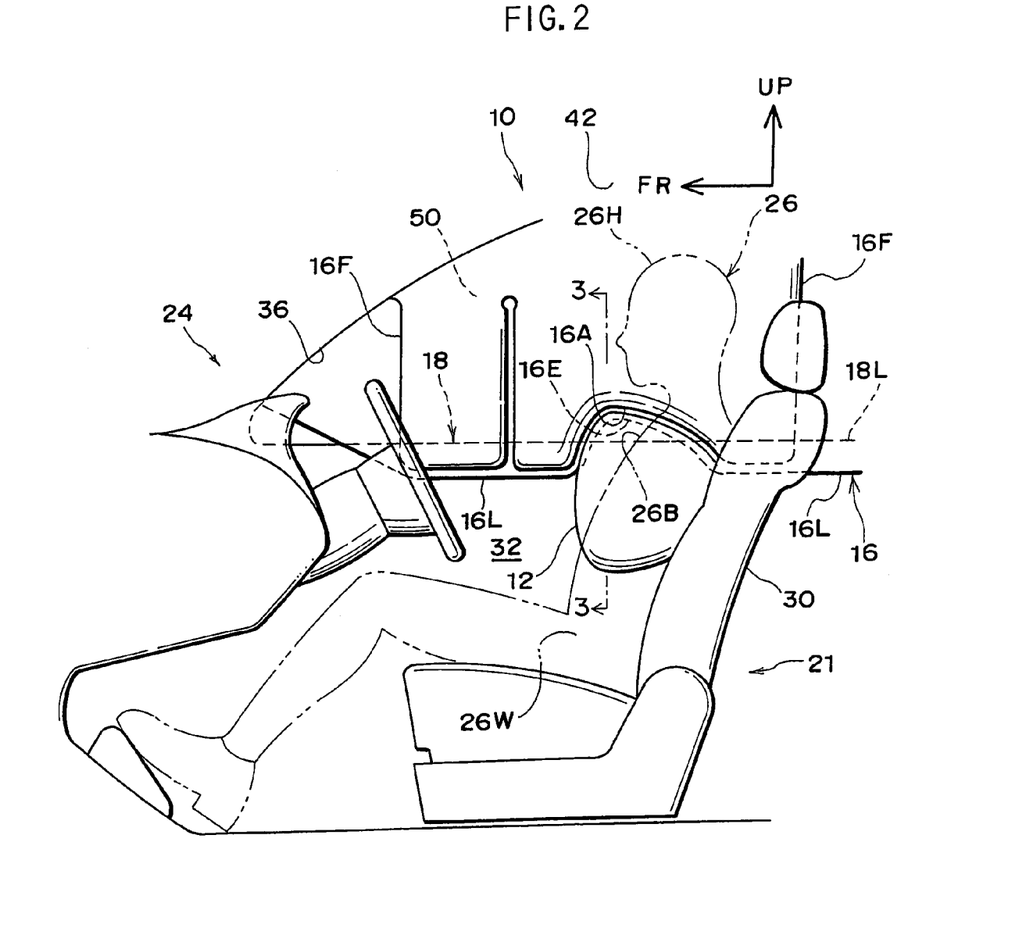
FIG. 2 is an enlarged side view viewing a state of deploying a head protection air bag member and a side air bag member in correspondence with a front vehicle seat from the inner side of the vehicle compartment.

Further, the side air bag member 12 deploys between the passenger 26 seated on the front vehicle seat 21 and the door 18 by being bulged to inside of a vehicle compartment 32 from a side portion on a side of a door of the seat back 30 by being expanded to deploy by receiving supply of the gas from the inflator and opening to break a predetermined portion of the seat back 30 by a deploying pressure thereof. A deploying region of the side air bag member 12 is in correspondence with, for example, a height of the chest portion 26B (FIG. 2) of the passenger 26 and is set to be able to cover the chest portion 26B from a side direction thereby. Further, an upper portion of the side air bag member 12 upon deployment reaches, for example, a portion of the vehicle higher than a belt line 18L of the door 18 provided at, for example, a side portion of a vehicle body. The deploying region of the side air bag member 12 is not limited thereto but the deploying region may be set to be able to cover, for example, from the chest portion 26B to the waist portion 26W of the passenger 26.

Figure 3:
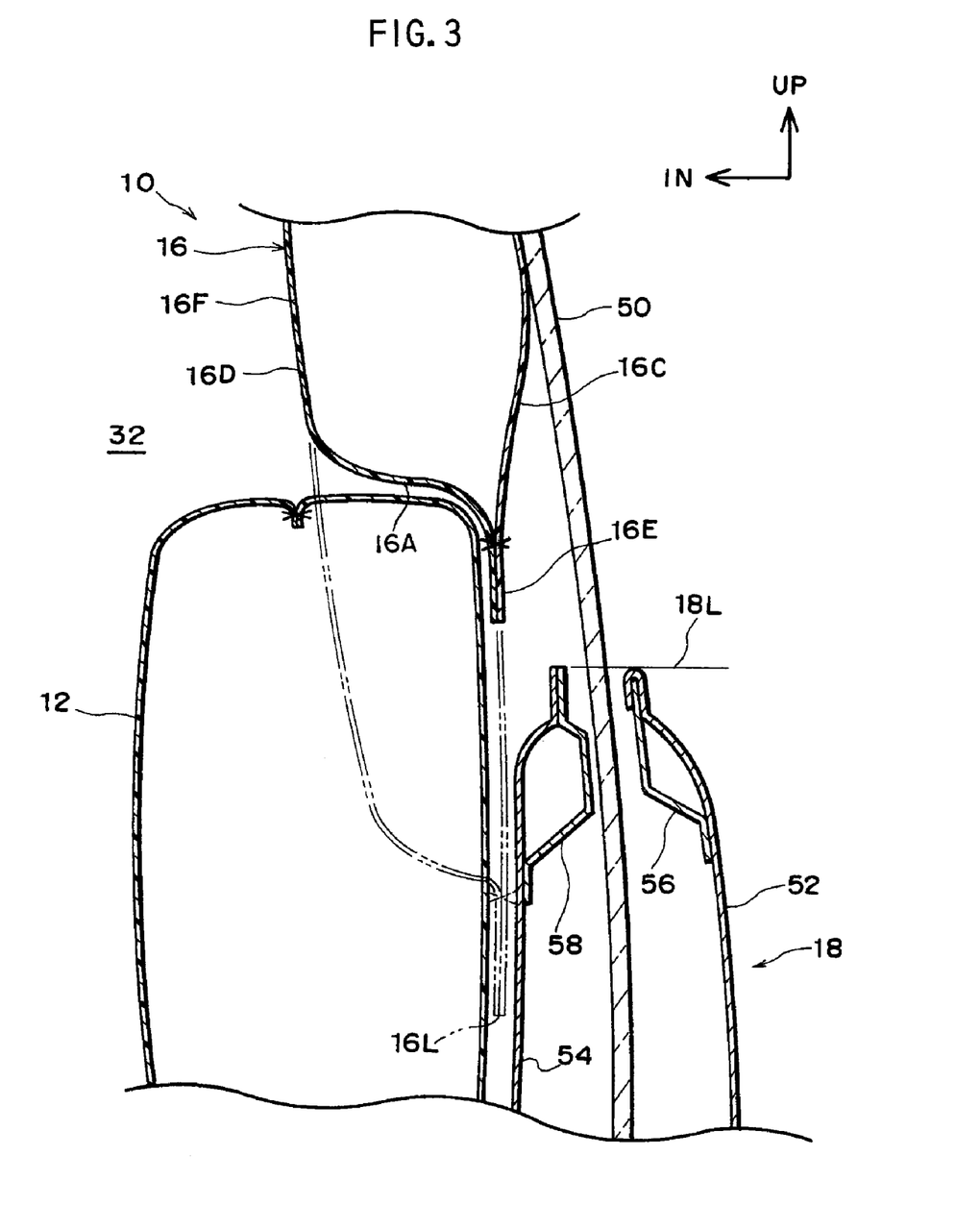
FIG. 3 is an enlarged sectional view taken along a line 3-3 of FIG. 2 showing a state of fitting the deployed side air bag member with a recessed portion of the head protection air bag member.

Here, the belt line 18L refers to a line passing a lower end of a side window 50 of the vehicle 24, that is, an upper end of a door panel. In FIG. 3, the door 18 includes a door outer panel 52 on an outer side in a vehicle width direction and a door inner panel 54 on an inner side in the vehicle width direction as the door panel, however, when heights differs at an upper end of the door outer panel 52 at an upper end of the door inner panel 54, the upper end of the door panel on the side of the vehicle compartment 32 at which the side air bag member 12 or the head protection air bag member 16 deploys, that is, the door inner panel 54 constitutes a reference. According to the door 18 of the embodiment, upper portions of the door outer panels 52 and 54 are reinforced respectively by, for example, reinforcements 56 and 58. Further, the constitution of the door 18 is not limited to an illustrated constitution.

On the other hand, as shown by FIG. 1, the side air bag member 14 is a bag member arranged inside of a door 18 constituting an example of a side portion of the vehicle body or a rear vehicle seat 22 constituting an example of a vehicle seat, and deploys between a passenger 28 seated on the rear vehicle seat 22 and the door 18 by being expanded by receiving supply of the gas from the inflator, not illustrated, in side impact or in rolling over of the vehicle 24. Further, the rear vehicle seat 22 is an example of a vehicle seat to the rear of the front vehicle seat 21 and in a case of a vehicle provided with the vehicle seats by, for example, 3 rows, a side air bag member of a member in correspondence with a vehicle seat of a third row may further be provided.

According to the example, an air bag module (not illustrated) constituted by containing, for example, the side air bag member 14 and the inflator inside of an air bag case is included at a side portion on a side of the door of a seat back 34 of the rear vehicle seat 22. The inflator is constituted to be operated by receiving an operating current from the air bag ECU, not illustrated, for supplying the gas for expansion to the side air bag member 14. The air bag ECU is constituted to make an operating current flow to the inflator when side impact or rolling over of the vehicle 24 is determined based on a signal from the side impact sensor or the rolling over sensor, not illustrated. Here, at the air bag module, the air bag case need not be provided.

Further, the side air bag member 14 deploys between the passenger 28 seated on the rear vehicle seat 22 and the door 18 by being bulged to inside of the vehicle compartment 32 from a side portion on a side of the door of the seat back 34 by deploying to bulge by receiving supply of the gas from the inflator and opening to break a predetermined portion of the seat back 34 by a deploying pressure thereof. A deploying region of the side air bag member 14 is in correspondence with a height of, for example, the chest portion 28B of the passenger 28 and is set to be able to cover the chest portion 28B from a side direction thereby. Further, an upper portion of the side air bag member 14 upon deployment reaches a portion of the vehicle higher than the belt line 18L of the door 18. Further, the deploying region of the side air bag member 14 is not limited thereto but may be constituted to be able to cover, for example, from the chest portion 28B to the waist portion 28W of the passenger 28.

The head protection air bag member 16 is arranged in a folded state along a roof side rail 42 over, for example, an A pillar 36, a B pillar 38 and a C pillar 40 and connected with an inflator 44 at, for example, a rear end portion thereof. Specifically, an upper edge of the head protection air bag member 16 is formed with attaching pieces 46 at arbitrary intervals. By fastening to fix the attaching pieces 46 to the roof side rail 42 by bolts and nuts (not illustrated), the head portion protection air bag member 16 is fixed to a side of the body. Further, the head portion protection air bag member 16 deploys in a curtain shape to a lower side inside of the vehicle compartment up to a position of being overlapped by the deploying regions of the side air bag members 12 and 14 in the vehicle width direction by being expanded by receiving supply of the gas in side impact or rolling over of the vehicle 24.

Here, the inflator 44 is constituted to supply the gas for expansion to the head portion protection air bag member 16 by being operated by receiving an operating current from the air bag ECU, not illustrated. The air bag ECU is constituted to make the operating current flow to the inflator 44 when side impact or rolling over of the vehicle 24 is determined based on a signal from a side impact sensor or a rolling over sensor, not illustrated.

In FIG. 1, the head portion protection air bag member 16 includes a front side expansion portion 16F which expands at a side of the head portion 26H of the passenger 26 seated on the front vehicle seat 21 and a rear side expansion portion 16R that expands at a side of the head portion 28H of the passenger 28 seated on the rear vehicle seat 22. A position of connecting the inflator 44 to the head portion protection air bag member 16 is not limited to the rear end portion of the portion protection air bag member 16, but may be, for example, a front end portion or substantially a center portion in a front and rear direction of the vehicle, of the head portion protection air bag member 16.

A lower edge portion 16L of the head portion protection air bag member 16 upon deployment is disposed at a portion of the vehicle lower than the belt line 18L of the door 18. Further, the head portion protection air bag member 16 is constituted by a shape that fits with respectively the deployed side air bag members 12 and 14.

Specifically, a portion of the head portion protection air bag member 16 overlapping at least the deploying regions of the side air bag members 12 and 14 in the vehicle width direction when the head portion air bag member 16 deploys is a recessed portion 16A comprising a nonexpanding portion in a notch shape. As shown by FIG. 3, the head portion protection air bag member 16 is constituted as a bag member by bonding outer side base cloth 16C constituting an outer side in the vehicle width direction and inner side base cloth 16D constituting an inner side in the vehicle width direction upon deployment by, for example, weaving. Further, the head portion protection air bag member 16 may be constituted by being woven into a bag. The outer base cloth 16C of the recessed portion 16A is provided with a seam portion 16E constituted by seaming together the outer side base cloth 16C and the inner side base cloth 16D in an edge shape along a contour of the recessed portion 16A in a side view of the vehicle (also refer to FIG. 2). Explaining by taking an example of the side air bag member 12, as shown by FIG. 3, the seam portion 16E is set to be disposed on an outer side in the vehicle width direction of the side air bag member 12 in deploying the side air bag member 12 and the head portion protection air bag member 16. Although not illustrated, also a positional relationship between the side air bag member 14 and the seam portion 16E is similar thereto. Further, at the recessed portion 16A, the outer side base cloth 16C and the inner side base cloth 16D at portions of the vehicle lower than the seam portion 16E are omitted. This is for achieving light-weighted formation, small-sized formation and low cost formation in being folded of the head portion protection air bag member 16.

As shown by FIG. 3, an expansion thickness of the side air bag member 12 in a vehicle width direction is larger than an expansion thickness of, for example, the front side expanding portion 16F constituting a general portion of the head protection air bag member 16, for example, about twice as much as the expansion thickness of the front side expanding portion 16F in consideration of a general side impact mode in which a bumper (not illustrated) of a counter party vehicle is impacted to the vehicle body side portion (door 18 or the like). Further, an inner pressure of the side air bag member 12 is higher than an inner pressure of the head protection air bag member 16.

Further, the recessed portion 16A of the head protection air bag member 16 is not limited to the nonexpanding portion but may comprise a thin expanding portion, that is, a non-recessed film portion, having an expansion thickness represented by the outer side base cloth 16C is less than that of the front side expanding portion 16F. Further, although at the recessed portion 16A, portions of the outer side base cloth 16C and the inner side base cloth 16D constituting portions of the vehicle lower than the seam portion 16E are omitted, the invention is not limited thereto but the outer side base cloth 16C and the inner side base cloth 16D may remain in a film-like shape. Because a reaction force to the passenger 26 is made to be easy to be produced by receiving a load inputted from the passenger 26 to the side air bag member 12 by the inner side base cloth 16D and the outer side base cloth 16C which remain in the recessed portion 16A to be transmitted to the vehicle body side portion in side impact or rolling over of the vehicle 24. In addition thereto, by comprising the recessed portion 16A of the head portion protection air bag member 16 by the nonexpanding portion or the thin expanding portion, a capacity of the head portion protection air bag member 16 can be made to be small, thereby, expanding deployment of the head protection air bag member 16 can be made to be swift.

Further, although in the above-described constitution, the side air bag member 12 is arranged inside of the door side portion of the seat back 30 of the front vehicle seat 21 and the side air bag member 14 is inwardly provided at the door side portion of the seat back 34 of the rear vehicle seat 22, portions of installing the side air bag members 12 and 14 are not limited to the vehicle seats but may be the vehicle body side portions. Here, the vehicle body side portion is not limited to the door 18 but may be a vehicle compartment side wall portion at which the door 18 is not provided.

Operation

The embodiment is constituted as described above and an operation thereof will be explained as follows. In FIG. 1, at the air bag device for automobile 10, when the air bag ECU determines occurrence of side impact or rolling over of the vehicle 24 based on the signal from the side impact sensor or the rolling over sensor, ignition currents are made to flow to the inflators inwardly provided respectively at the door side portion of the seat back 30 of the front vehicle seat 21 and the door side portion of the seat back 34 of the rear vehicle seat 22. By operating the inflators by the ignition currents, large amounts of the gas are respectively produced from the inflators, and the gas is respectively supplied to the side air bag member 12 and the side bag member 14.

Thereby, the side air bag member 12 is expanded from inside of the seat back 30 of the front vehicle seat 21 to inside of the vehicle compartment 32 and is expanded to between the passenger 26 seated on the front vehicle seat 21 and the door 18 and the side air bag member 14 is expanded from inside of the seat back 34 inside of the seat back 22 to the vehicle compartment 32 and deploys between the passenger 28 seated on the rear vehicle seat 22 and the door 18. By the side air bag member 12 deployed in this way, impact to, for example, the chest portions 26B and 28B of the passengers 26 and 28 can be absorbed. According to the embodiment, the side air bag member 12 in correspondence with the front vehicle seat 21 and the side air bag member 14 in correspondence with the rear vehicle seat 22 are provided in this way, and therefore, not only the passenger 26 seated on the front vehicle seat 21 but also the passenger 28 seated on the rear vehicle seat 22 can similarly be protected.

Further, at this occasion, the ignition current is made to flow also to the inflator 44 for the head portion protection air bag member 16 from the air bag ECU. The inflator 44 is operated by the ignition current to produce a large amount of the gas. By supplying the gas to the head portion protection air bag member 16, the head portion protection air bag member 16 deploys in a curtain shape to a lower side inside of the vehicle compartment up to a position of overlapping the deploying regions of the side air bag members 12 and 14 in the vehicle width direction while being brought to between the passenger 26 seated on the front vehicle seat 21 and the door 18 (side window 50) and between the passenger 28 seated on the rear vehicle seat 22 and the door 18 (side window 50). Thereby, the front side expanding portion 16F is brought into a state of expanding at the side of the head portion 26H of the passenger 26 and the rear side expanding portion 16R is brought into a state of expanding at the side of the head portion 28H of the passenger 28, and therefore, impact from, for example, the door 18 (side window 50) to the head portions 26H and 28H in side impact can be absorbed and rolling over of the vehicle 24 can be dealt with.

At this occasion, the head portion protection air bag member 16 deploys in the curtain shape to the lower side inside of the vehicle compartment up to the positions of overlapping the deploying regions of the side air bag members 12 and 14 in the vehicle width direction as described above, the head portion protection air bag member 16 is provided with the recessed portions 16A, and therefore, the side air bag members 12 and 14 can be respectively fitted to the recessed portions 16A. Therefore, an interference between the side air bag member 12 and the head portion protection air bag member 16 can be restrained while deploying the head portion protection air bag member 16 up to the position of overlapping the deploying region of the side air bag member 12 in the vehicle width direction, thereby, both of side impact and rolling over of the vehicle 24 can be dealt with.

Further, the recessed portions 16A of the head portion protection air bag member 16 are respectively provided in correspondence with standard deploying regions of the side air bag members 12 and 14, and therefore, even when directions of deploying the side air bag members 12 and 14 are varied, the positions of deploying the side air bag members 12 and 14 can be restricted to preferable positions by the recessed portions 16A. Specifically, even when the side air bag members 12 and 14 are going to deploy to portions of the vehicle upward or portions of the vehicle frontward from, for example, the standard deploying positions, the recessed portions 16A restrain the deployment, thereby, the side air bag members 12 and 14 can deploy to the standard positions. Therefore, a positional relationship between the front vehicle seat side air bag member 12 and the front vehicle seat passenger 26 and a positional relationship between the rear vehicle seat side air bag member 14 and the rear vehicle seat passenger 28 can respectively made to be brought into pertinent states. Further, thereby, impacts to, for example, the recessed portions 26B and 28B of the passengers 26 and 28 can further efficiently be absorbed.

Further, when the head portion protection air bag member 16 deploys, the lower edge portion 16L of the head portion protection air bag member 16 is disposed at the portion of the vehicle lower than the belt line 18L of the door 18, and therefore, when a load to the outer side of the vehicle compartment is inputted to the head portion protection air bag member 16, that is, when a load is inputted from the head portion 26H of the front vehicle seat passenger 26 or the head portion 28H of the rear vehicle seat passenger 28 to the head portion protection air bag member 16, the load can be received by the door 18 to produce the reaction force. Therefore, a performance of protecting the passenger particularly in rolling over of the vehicle 24 can further be promoted.

Further, as shown by FIG. 3, the expansion thickness of the side air bag member 12 of the front vehicle seat 21 in the vehicle width direction is larger than the expansion thickness of the front side expansion portion 16F of the head portion protection air bag member 16, and therefore, in a general side impact mode of impacting a bumper (not illustrated) of a counter party vehicle to the vehicle side portion (door 18 or the like), the impact to the chest portion 26B (FIG. 2) of the passenger 26 can efficiently be absorbed. The same goes with the side air bag member 14 (FIG. 1) for the rear vehicle seat 22.

Further, although according to the embodiment, the head portion protection air bag member 16 has a shape that fits with respectively the deployed side air bag members 12 and 14, "that fits with respectively the deployed side air bag members 12 and 14" is not limited to meaning that the head portion protection air bag member 16 can fit the side air bag members 12, 14 upon deployment without a clearance therebetween. That is, "that fits with respectively the deployed side air bag member 12" signifies to construct a constitution of capable of restraining the interference between the side air bag member 12 and the head portion protection air bag member 16 such that the side air bag member 12 and the head portion protection air bag member 16 can respectively deploy pertinently, and also includes a constitution in which the side air bag members 12 and 14 are brought into the recessed portion 16A with clearances therebetween. Further, the interference in this case does not include the interference when the position of deploying the side air bag member 12 is restrained to the preferable position by the head portion protection air bag member 16. The same goes with a relationship between the side air bag member 14 and the head portion protection air bag member 16.

Second Embodiment

Figure 4:
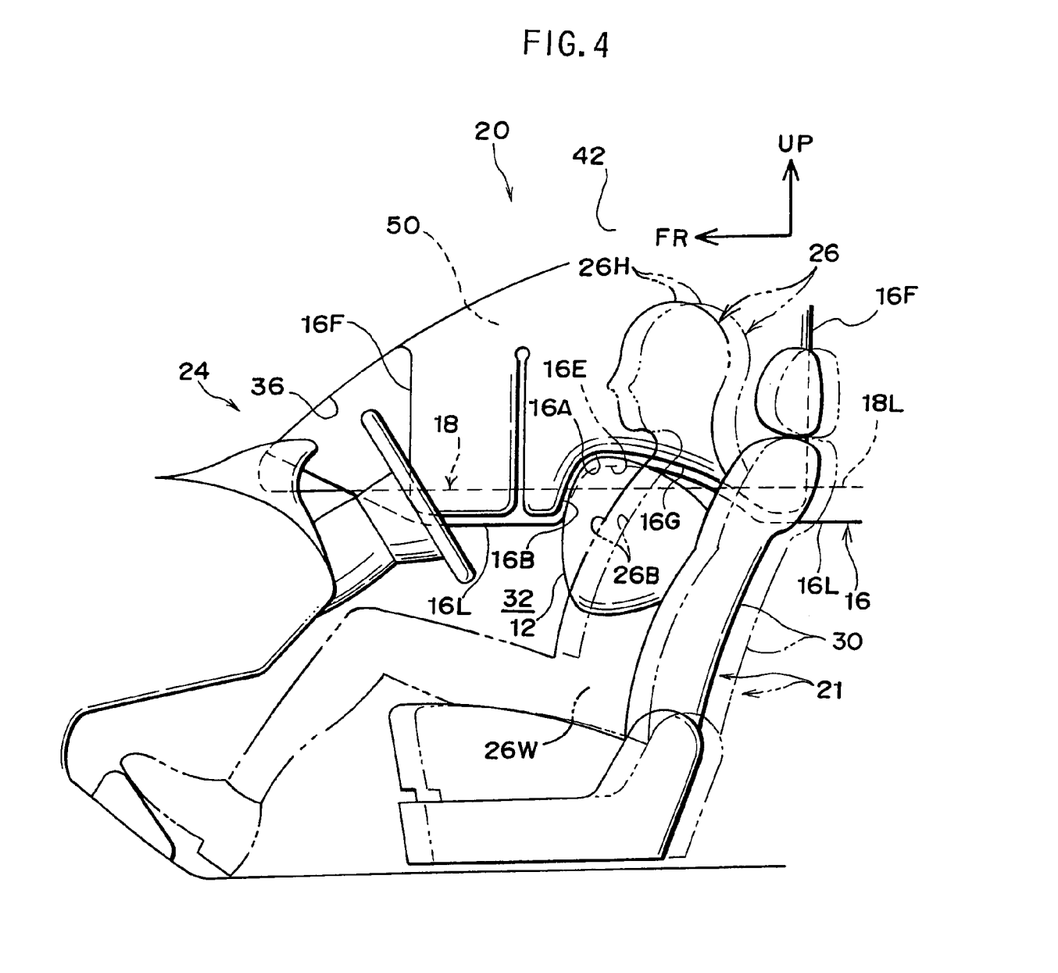
Figure 5:
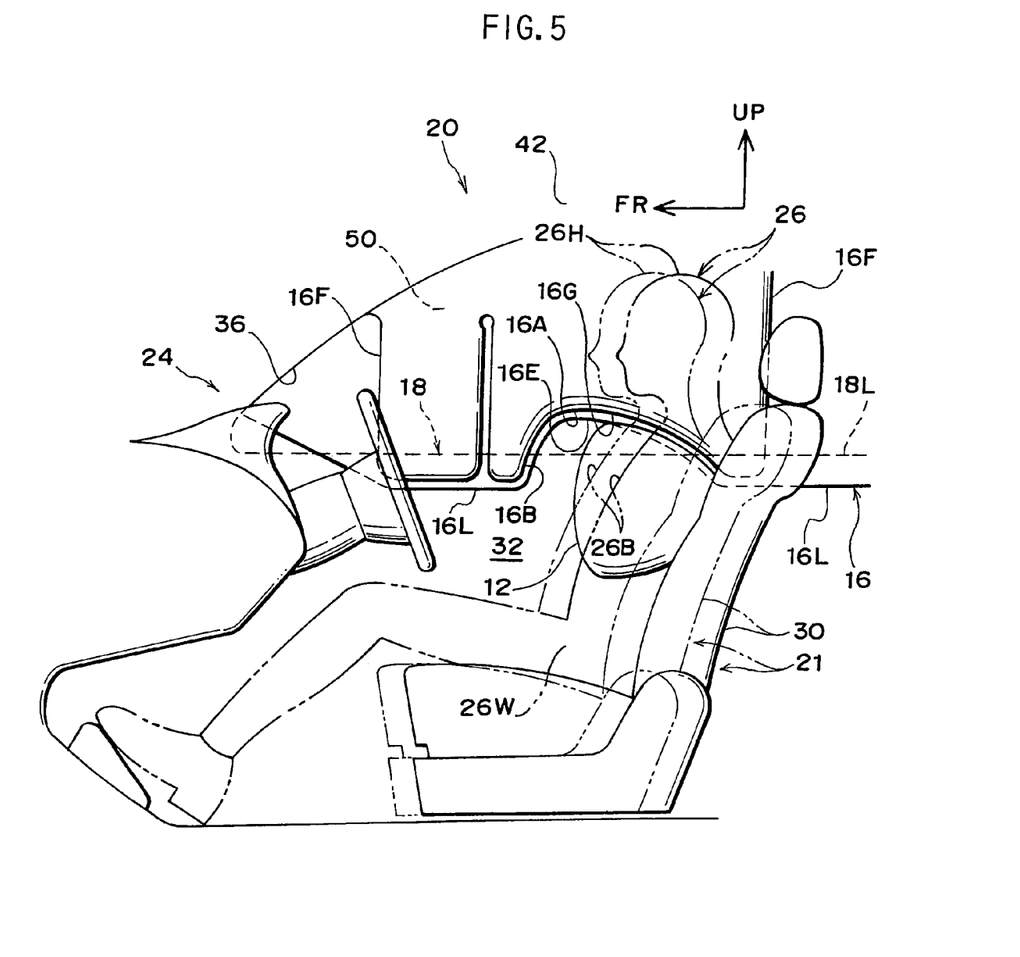
FIG. 5 is an enlarged side view viewing a state of deploying the head protection air bag member and the side air bag member in correspondence with the front vehicle seat in a state in which the front vehicle seat is disposed on a rear side of the vehicle from the inner side of the vehicle compartment.
Figure 6:
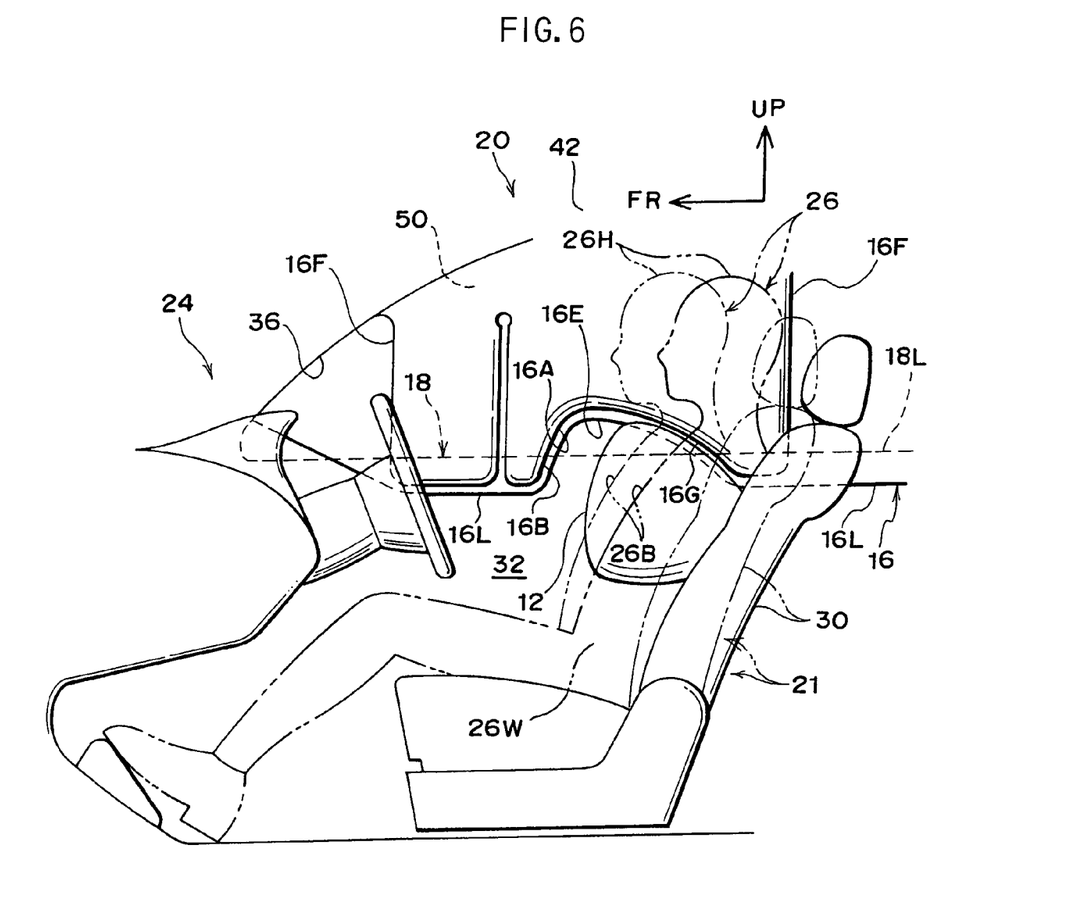
FIG. 6 is an enlarged side view viewing a state of deploying the head protection air bag member and the side air bag member in correspondence with the front vehicle seat in a state in which an angle of inclining a seat back to a rear side of the vehicle is comparatively large from the inner side of the vehicle compartment.

In FIG. 4 through FIG. 6, in an air bag device for automobile 20 according to the embodiment, the recessed portion 16A of the head portion protection air bag member 16 is set to be larger than that of the first embodiment in a front and rear direction of the vehicle in consideration of a case in which the front vehicle seat 21 is constituted to be slidable in the front and rear direction of the vehicle and a position of the front vehicle seat 21 in the front and rear direction is constituted to be able to adjust in a predetermined range.

As shown by FIG. 5, a front wall portion 16B of the recessed portion 16A of the head portion protection air bag member 16 upon deployment is formed to rise from, for example, the lower edge portion 16L in a rear direction and in a skewed upper direction of the vehicle in correspondence with a contour of the front portion of the side air bag member 12 in a side view of the vehicle and continues to an upper wall portion 16G of the recessed portion 16A by a height in correspondence with an upper end of the side air bag member 12. The upper wall portion 16G gradually extends in a downward and rearward direction of the vehicle, for example, in correspondence with the counter of the side air bag member 12 in the side view of the vehicle and continues to the lower edge portion 16L at a vicinity of a side of the seat back 30.

The other portion is similar to that of the first embodiment, and therefore, the same portions are attached with the same notations in the drawings and an explanation thereof will be omitted.

Operation

The embodiment is constituted as described above and an operation thereof will be explained as follows. First, as shown by FIG. 4, an explanation will be given of a case in which the front and rear position of the vehicle seat 21 is adjusted to the portion of the vehicle frontward from a middle position indicated by a two-dotted chain line. According to the air bag device for automobile 20, when side impact or rolling over of the vehicle 24 is brought about, similar to the first embodiment, the side air bag member 12 and the head portion protection air bag member 16 deploy and the side air bag member 12 is brought into a state of being fitted to the recessed portion 16A of the head portion protection air bag member 16. The recessed portion 16A extends farther in the front and rear direction of the vehicle than in the first embodiment in consideration of a sliding range of the front vehicle seat 21, and therefore, even when the front vehicle seat 21 is adjusted to the position of the vehicle frontward from the middle position, the side air bag member 12 can be fitted to the recessed portion 16A.

Next, as shown by FIG. 5, an explanation will be given of a case in which the front and rear position of the front vehicle seat 21 is adjusted to a position of the vehicle to the rear of the middle position indicated by the two-dotted chain line. Also in this case, similarly, the recessed portion 16A extends farther in the front and rear direction of the vehicle than the first embodiment, and therefore, even when the front vehicle seat 21 is adjusted to the position of the vehicle to the rear of the middle position, the side air bag member 12 can be fitted to the recessed portion 16A.

Successively, as shown by FIG. 6, an explanation will be given of a case in which the seat back 30 of the front vehicle seat 21 disposed at, for example, the middle position is fallen in an angular position of the vehicle to the rear of a standard angular position indicated by the two-dotted chain line, that is, a case in which an angle of inclination of the seat back 30 becomes large. In this case, although the side air bag member 12 is going to deploy in the upper direction of the vehicle more than that of the case in which the seat back 30 is disposed at the standard angular position, according to the embodiment, the deployment in the upper direction of the vehicle can be restrained by the upper wall portion 16G of the recessed portion 16A of the head portion protection air bag member 16.

Further, the upper wall portion 16G gradually extends in the downward and rearward direction of the vehicle, and therefore, even when the angle of inclination of the seat back 30 is larger and the position of the side air bag member 12 is moved in the rear direction of the vehicle and in the downward direction of the vehicle, the deployment of the side air bag member 12 in the upper direction of the vehicle can be restrained.

In this way, according to the air bag device for automobile 20, even when the front and rear position of the front vehicle seat 21 or the angle of inclination of the seat back 30 is changed, the positional relationship between the side air bag member 12 and the passenger 26 can be made to be brought into the pertinent state and the impact to, for example, the chest portion 26B of the passenger 26 in side impact can efficiently be absorbed.

Further, although according to the embodiment, an explanation has been given of the side air bag member 12 for the front vehicle seat 21, a similar side air bag member is applicable also to a vehicle seat to the rear of the front vehicle seat 21.

Further, a shape of the recessed portion 16A of the head portion protection air bag member 16 is not limited to the illustrated shape but the height of the upper end of the side air bag member 12 may be constituted to be constant upon deployment even when the front and rear position of the front vehicle seat 21 is changed by setting, for example, the upper wall portion 16G substantially in parallel with the direction of sliding the front vehicle seat 21.

What is claimed is:

1. An air bag device for an automobile, comprising:
   a side air bag member arranged in a folded state attached to a vehicle body side portion or a vehicle seat, which expands by being supplied with a gas upon a vehicle being impacted from the side or rolling over, and which deploys between a passenger seated on the vehicle seat and the vehicle body side portion; and
   a head portion protection air bag member arranged in a folded state along a roof side rail, which expands by being supplied with a gas upon a vehicle being impacted from the side or rolling over, and which deploys in a curtain shape in a downward direction inside of a vehicle compartment down to a position overlapping a deploying region of the side air bag in a vehicle width direction, and which has a shape that fits with the deployed side air bag member;
   wherein the shape of the head portion protection air bag member that fits with the deployed side air bag member comprises a recessed portion having a curved contour;
   wherein the recessed portion includes a nonexpanding portion extending downward from a bottom of the head portion protection air bag member and overlapping the deployed side airbag member in the vehicle width direction and a notch shape comprising a concave surface, the concave surface partially surrounding an opposing convex surface of the side airbag member; and
   wherein a free bottom edge of the nonexpanding portion closely approximates the curved contour of the recessed portion.

2. The air bag device for an automobile according to claim 1, wherein a lower edge portion of the head portion protection air bag member when fully inflated is disposed at a position in the vehicle lower than a belt line of a door arranged at the vehicle body side portion.

3. The air bag device for an automobile according to claim 2, wherein the side air bag member is provided in correspondence with a front vehicle seat and a vehicle seat to the rear of the front vehicle seat.

4. The air bag device for an automobile according to claim 1, wherein the side air bag member is provided in correspondence with a front vehicle seat and a vehicle seat to the rear of the front vehicle seat.

5. The air bag device for an automobile according to claim 1, wherein the side air bag member is arranged inside of a door side portion of a seat back of the vehicle seat.

6. The air bag device for an automobile according to claim 1, wherein the side air bag member is arranged inside of a door provided at the vehicle body side portion.

7. The air bag device for an automobile according to claim 1, wherein an upper portion of the side air bag member when fully inflated reaches a position of the vehicle higher than a belt line of a door provided at the vehicle body side portion.

8. The air bag device for an automobile according to claim 1, wherein the recessed portion comprises a non-recessed film portion comprising an outer side base cloth and an inner side base cloth included in the head portion protection air bag member.

9. The air bag device for an automobile according to claim 1, wherein the recessed portion extends farther in the front and rear direction of the vehicle than the side air bag member in accordance with a sliding range of the vehicle seat.

10. The air bag device for an automobile according to claim 1, wherein an upper wall portion of the recessed portion extends in a downward and rearward direction of the vehicle and continues to a lower edge portion of the head portion protection air bag member at a vicinity of a side of the seat back of the vehicle seat.

11. The air bag device for an automobile according to claim 1, wherein an expansion thickness of the side air bag member in the vehicle width direction is larger than an expansion thickness of an expanding portion of the head portion protection air bag member which expands at a side of the head portion of the passenger.

12. The air bag device for an automobile according to claim 1, wherein an inner pressure of the side air bag member is higher than an inner pressure of the head protection air bag member.

13. The air bag device for an automobile according to claim 1, wherein the nonexpanding portion is positioned between an outer side of the side airbag member and the vehicle body side portion in the vehicle width direction.

14. The air bag device for an automobile according to claim 13, wherein the recessed portion comprises a non-recessed film portion comprising an outer side base cloth and an inner side base cloth included in the head portion protection air bag member.

* * * * *